United States Patent
Duparre

(10) Patent No.: US 9,638,883 B1
(45) Date of Patent: *May 2, 2017

(54) PASSIVE ALIGNMENT OF ARRAY CAMERA MODULES CONSTRUCTED FROM LENS STACK ARRAYS AND SENSORS BASED UPON ALIGNMENT INFORMATION OBTAINED DURING MANUFACTURE OF ARRAY CAMERA MODULES USING AN ACTIVE ALIGNMENT PROCESS

(71) Applicant: FotoNation Cayman Limited, San Jose, CA (US)

(72) Inventor: Jacques Duparre, Jena (DE)

(73) Assignee: FotoNation Cayman Limited, San Jose, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 14/195,675

(22) Filed: Mar. 3, 2014

Related U.S. Application Data

(60) Provisional application No. 61/772,443, filed on Mar. 4, 2013.

(51) Int. Cl.
  *G02B 7/00* (2006.01)
  *G06T 7/00* (2017.01)

(52) U.S. Cl.
  CPC ............ *G02B 7/003* (2013.01); *G06T 7/0004* (2013.01)

(58) Field of Classification Search
  CPC ................................ G02B 7/003; G06T 7/004
  (Continued)

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| CN | 101102388 A | 1/2008 |
| CN | 101147392 A | 3/2008 |

(Continued)

OTHER PUBLICATIONS

Kutulakos et al., "Occluding Contour Detection Using Affine Invariants and Purposive Viewpoint Control", Proc., CVPR 94, 8 pgs.

(Continued)

*Primary Examiner* — William C Vaughn, Jr.
*Assistant Examiner* — Naod Belai
(74) *Attorney, Agent, or Firm* — KPPB LLP

(57) ABSTRACT

Systems and methods in accordance with embodiments of the invention actively align a representative optic array with an imager array, and subsequently passively align constituent optic arrays with constituent imager arrays based on data from the active alignment. In one embodiment, a method of aligning a plurality of lens stack arrays with a corresponding plurality of sensors includes: aligning a first lens stack array relative to a first sensor, varying the spatial relationship between the first lens stack array and the first sensor; capturing images of a known target using the arrangement at different spatial relationships between the first lens stack array and the first sensor; scoring the quality of the captured images; and aligning at least a second lens stack array relative to at least a second sensor, based on the scored images and the corresponding spatial relationships by which the scored images were obtained.

3 Claims, 10 Drawing Sheets

(58) Field of Classification Search
USPC .................................................. 348/95, 187
See application file for complete search history.

(56) References Cited

U.S. PATENT DOCUMENTS

| | | | |
|---|---|---|---|
| 4,323,925 A | 4/1982 | Abell et al. | |
| 4,460,449 A | 7/1984 | Montalbano | |
| 5,005,083 A | 4/1991 | Grage | |
| 5,808,350 A | 9/1998 | Jack et al. | |
| 5,832,312 A | 11/1998 | Rieger et al. | |
| 5,880,691 A | 3/1999 | Fossum et al. | |
| 5,933,190 A | 8/1999 | Dierickx et al. | |
| 5,973,844 A | 10/1999 | Burger | |
| 6,002,743 A | 12/1999 | Telymonde | |
| 6,034,690 A | 3/2000 | Gallery et al. | |
| 6,069,365 A | 5/2000 | Chow et al. | |
| 6,124,974 A | 9/2000 | Burger | |
| 6,137,535 A | 10/2000 | Meyers | |
| 6,141,048 A | 10/2000 | Meyers | |
| 6,160,909 A | 12/2000 | Melen | |
| 6,172,352 B1 | 1/2001 | Liu et al. | |
| 6,205,241 B1 | 3/2001 | Melen | |
| 6,358,862 B1 | 3/2002 | Ireland et al. | |
| 6,571,466 B1 | 6/2003 | Glenn et al. | |
| 6,603,513 B1 | 8/2003 | Berezin | |
| 6,611,289 B1 | 8/2003 | Yu | |
| 6,635,941 B2 | 10/2003 | Suda | |
| 6,671,399 B1 | 12/2003 | Berestov | |
| 6,765,617 B1 | 7/2004 | Tangen et al. | |
| 6,771,833 B1 | 8/2004 | Edgar | |
| 6,774,941 B1 | 8/2004 | Boisvert et al. | |
| 6,795,253 B2 | 9/2004 | Shinohara | |
| 6,879,735 B1 | 4/2005 | Portniaguine et al. | |
| 6,903,770 B1 | 6/2005 | Kobayashi et al. | |
| 6,909,121 B2 | 6/2005 | Nishikawa | |
| 6,958,862 B1 | 10/2005 | Joseph | |
| 7,085,409 B2 | 8/2006 | Sawhney et al. | |
| 7,199,348 B2 | 4/2007 | Olsen et al. | |
| 7,262,799 B2 | 8/2007 | Suda | |
| 7,292,735 B2 | 11/2007 | Blake et al. | |
| 7,295,697 B1 | 11/2007 | Satoh | |
| 7,391,572 B2 | 6/2008 | Jacobowitz et al. | |
| 7,408,725 B2 | 8/2008 | Sato | |
| 7,606,484 B1 | 10/2009 | Richards et al. | |
| 7,633,511 B2 | 12/2009 | Shum et al. | |
| 7,639,435 B2 | 12/2009 | Chiang et al. | |
| 7,657,090 B2 | 2/2010 | Omatsu et al. | |
| 7,675,681 B2 | 3/2010 | Tomikawa et al. | |
| 7,706,634 B2 | 4/2010 | Schmitt et al. | |
| 7,723,662 B2 | 5/2010 | Levoy et al. | |
| 7,912,673 B2 | 3/2011 | Hébert et al. | |
| 8,013,904 B2 | 9/2011 | Tan et al. | |
| 8,027,531 B2 | 9/2011 | Wilburn et al. | |
| 8,044,994 B2 | 10/2011 | Vetro et al. | |
| 8,077,245 B2 | 12/2011 | Adamo et al. | |
| 8,098,304 B2 | 1/2012 | Pinto et al. | |
| 8,106,949 B2 | 1/2012 | Tan et al. | |
| 8,126,279 B2 | 2/2012 | Marcellin et al. | |
| 8,131,097 B2 | 3/2012 | Lelescu et al. | |
| 8,164,629 B1 | 4/2012 | Zhang | |
| 8,189,089 B1 | 5/2012 | Georgiev | |
| 8,213,711 B2 | 7/2012 | Tam | |
| 8,231,814 B2 | 7/2012 | Duparre | |
| 8,305,456 B1 | 11/2012 | McMahon | |
| 8,360,574 B2 | 1/2013 | Ishak et al. | |
| 8,400,555 B1 | 3/2013 | Georgiev | |
| 8,406,562 B2 | 3/2013 | Bassi et al. | |
| 8,514,491 B2 | 8/2013 | Duparre | |
| 8,542,933 B2 | 9/2013 | Venkataraman et al. | |
| 8,773,536 B1 | 7/2014 | Zhang | |
| 9,185,276 B2 | 11/2015 | Roda et al. | |
| 9,264,592 B2 | 2/2016 | Rodda et al. | |
| 9,426,343 B2 | 8/2016 | Rodda et al. | |
| 2001/0005225 A1 | 6/2001 | Clark et al. | |
| 2002/0027608 A1 | 3/2002 | Johnson | |
| 2002/0063807 A1 | 5/2002 | Margulis | |
| 2002/0087403 A1 | 7/2002 | Meyers et al. | |
| 2002/0089596 A1 | 7/2002 | Suda | |
| 2002/0094027 A1 | 7/2002 | Sato et al. | |
| 2002/0113867 A1 | 8/2002 | Takigawa et al. | |
| 2002/0113888 A1 | 8/2002 | Sonoda et al. | |
| 2002/0163054 A1 | 11/2002 | Suda et al. | |
| 2002/0167537 A1 | 11/2002 | Trajkovic | |
| 2002/0177054 A1 | 11/2002 | Saitoh et al. | |
| 2003/0124763 A1 | 7/2003 | Fan et al. | |
| 2003/0179418 A1 | 9/2003 | Wengender et al. | |
| 2003/0211405 A1 | 11/2003 | Venkataraman | |
| 2004/0008271 A1 | 1/2004 | Hagimori et al. | |
| 2004/0012689 A1 | 1/2004 | Tinnerino | |
| 2004/0047274 A1 | 3/2004 | Amanai | |
| 2004/0050104 A1 | 3/2004 | Ghosh et al. | |
| 2004/0056966 A1 | 3/2004 | Schechner et al. | |
| 2004/0100570 A1 | 5/2004 | Shizukuishi | |
| 2004/0114807 A1 | 6/2004 | Lelescu et al. | |
| 2004/0165090 A1 | 8/2004 | Ning | |
| 2004/0170340 A1 | 9/2004 | Tipping et al. | |
| 2004/0174439 A1 | 9/2004 | Upton | |
| 2004/0179834 A1 | 9/2004 | Szajewski | |
| 2004/0207836 A1 | 10/2004 | Chhibber et al. | |
| 2004/0213449 A1 | 10/2004 | Safaee-Rad et al. | |
| 2004/0218809 A1 | 11/2004 | Blake et al. | |
| 2004/0234873 A1 | 11/2004 | Venkataraman | |
| 2004/0251509 A1 | 12/2004 | Choi | |
| 2005/0006477 A1 | 1/2005 | Patel | |
| 2005/0010621 A1 | 1/2005 | Pinto et al. | |
| 2005/0012035 A1 | 1/2005 | Miller | |
| 2005/0036778 A1 | 2/2005 | DeMonte | |
| 2005/0048690 A1 | 3/2005 | Yamamoto | |
| 2005/0068436 A1 | 3/2005 | Fraenkel et al. | |
| 2005/0134712 A1 | 6/2005 | Gruhlke et al. | |
| 2005/0151759 A1 | 7/2005 | Gonzalez-Banos et al. | |
| 2005/0205785 A1 | 9/2005 | Hornback et al. | |
| 2005/0219363 A1 | 10/2005 | Kohler | |
| 2005/0225654 A1 | 10/2005 | Feldman et al. | |
| 2005/0286612 A1 | 12/2005 | Takanashi | |
| 2006/0002635 A1 | 1/2006 | Nestares et al. | |
| 2006/0023314 A1 | 2/2006 | Boettiger et al. | |
| 2006/0038891 A1 | 2/2006 | Okutomi et al. | |
| 2006/0054782 A1 | 3/2006 | Olsen et al. | |
| 2006/0072029 A1 | 4/2006 | Miyatake et al. | |
| 2006/0087747 A1 | 4/2006 | Ohzawa et al. | |
| 2006/0098888 A1 | 5/2006 | Morishita | |
| 2006/0103754 A1* | 5/2006 | Wenstrand | G02B 7/005 348/349 |
| 2006/0125936 A1 | 6/2006 | Gruhike et al. | |
| 2006/0138322 A1 | 6/2006 | Costello et al. | |
| 2006/0159369 A1 | 7/2006 | Young | |
| 2006/0176566 A1 | 8/2006 | Boettiger et al. | |
| 2006/0187338 A1 | 8/2006 | May et al. | |
| 2006/0210186 A1 | 9/2006 | Berkner | |
| 2006/0243889 A1 | 11/2006 | Farnworth et al. | |
| 2006/0251410 A1 | 11/2006 | Trutna | |
| 2007/0002159 A1 | 1/2007 | Olsen et al. | |
| 2007/0024614 A1 | 2/2007 | Tam | |
| 2007/0040922 A1 | 2/2007 | McKee et al. | |
| 2007/0041391 A1 | 2/2007 | Lin et al. | |
| 2007/0052825 A1 | 3/2007 | Cho | |
| 2007/0083114 A1 | 4/2007 | Yang et al. | |
| 2007/0102622 A1 | 5/2007 | Olsen et al. | |
| 2007/0127831 A1 | 6/2007 | Venkataraman | |
| 2007/0139333 A1 | 6/2007 | Sato et al. | |
| 2007/0146511 A1 | 6/2007 | Kinoshita et al. | |
| 2007/0160310 A1 | 7/2007 | Tanida et al. | |
| 2007/0171290 A1 | 7/2007 | Kroger | |
| 2007/0211164 A1 | 9/2007 | Olsen et al. | |
| 2007/0216765 A1 | 9/2007 | Wong et al. | |
| 2007/0257184 A1 | 11/2007 | Olsen et al. | |
| 2007/0258006 A1 | 11/2007 | Olsen et al. | |
| 2007/0258706 A1 | 11/2007 | Raskar et al. | |
| 2007/0268374 A1 | 11/2007 | Robinson | |
| 2007/0296835 A1 | 12/2007 | Olsen et al. | |
| 2007/0296847 A1 | 12/2007 | Chang et al. | |
| 2008/0019611 A1 | 1/2008 | Larkin | |
| 2008/0025649 A1 | 1/2008 | Liu et al. | |

(56) References Cited

U.S. PATENT DOCUMENTS

| | | |
|---|---|---|
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz |
| 2008/0118241 A1 | 5/2008 | Tekolste et al. |
| 2008/0131019 A1 | 6/2008 | Ng |
| 2008/0151097 A1 | 6/2008 | Chen et al. |
| 2008/0152296 A1 | 6/2008 | Oh et al. |
| 2008/0158698 A1 | 7/2008 | Chang et al. |
| 2008/0218610 A1 | 9/2008 | Chapman et al. |
| 2008/0219654 A1 | 9/2008 | Border et al. |
| 2008/0247638 A1 | 10/2008 | Tanida et al. |
| 2008/0247653 A1 | 10/2008 | Moussavi et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0102956 A1 | 4/2009 | Georgiev |
| 2009/0109306 A1 | 4/2009 | Shan et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0207235 A1 | 8/2009 | Francini et al. |
| 2009/0225203 A1 | 9/2009 | Tanida et al. |
| 2009/0268192 A1 | 10/2009 | Koenck et al. |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0086227 A1 | 4/2010 | Sun et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0142839 A1 | 6/2010 | Lakus-Becker |
| 2010/0157073 A1 | 6/2010 | Kondo et al. |
| 2010/0166410 A1 | 7/2010 | Chang et al. |
| 2010/0177411 A1 | 7/2010 | Hegde et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2010/0309292 A1 | 12/2010 | Ho et al. |
| 2011/0018973 A1 | 1/2011 | Takayama |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1* | 4/2011 | Venkataraman ..... H04N 5/2253 348/218.1 |
| 2011/0122308 A1 | 5/2011 | Duparre |
| 2011/0153248 A1 | 6/2011 | Gu et al. |
| 2011/0157321 A1 | 6/2011 | Nakajima et al. |
| 2011/0211824 A1 | 9/2011 | Georgiev et al. |
| 2011/0221658 A1 | 9/2011 | Haddick et al. |
| 2011/0241234 A1 | 10/2011 | Duparre |
| 2011/0279721 A1 | 11/2011 | McMahon |
| 2011/0285866 A1 | 11/2011 | Bhrugumalla et al. |
| 2011/0298917 A1 | 12/2011 | Yanagita |
| 2011/0310980 A1 | 12/2011 | Mathew |
| 2012/0012748 A1 | 1/2012 | Pain et al. |
| 2012/0026297 A1 | 2/2012 | Sato |
| 2012/0026342 A1 | 2/2012 | Yu et al. |
| 2012/0069235 A1 | 3/2012 | Imai |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0154551 A1 | 6/2012 | Inoue |
| 2012/0188634 A1 | 7/2012 | Kubala et al. |
| 2012/0198677 A1 | 8/2012 | Duparre |
| 2012/0229628 A1 | 9/2012 | Ishiyama et al. |
| 2012/0249550 A1 | 10/2012 | Akeley et al. |
| 2012/0287291 A1 | 11/2012 | McMahon |
| 2012/0314033 A1 | 12/2012 | Lee et al. |
| 2013/0002828 A1 | 1/2013 | Ding et al. |
| 2013/0003184 A1 | 1/2013 | Duparre |
| 2013/0010073 A1 | 1/2013 | Do |
| 2013/0050504 A1 | 2/2013 | Safaee-Rad et al. |
| 2013/0070060 A1 | 3/2013 | Chatterjee |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0088637 A1 | 4/2013 | Duparre |
| 2013/0113899 A1 | 5/2013 | Morohoshi et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0222556 A1 | 8/2013 | Shimada |
| 2013/0265459 A1 | 10/2013 | Duparre et al. |
| 2013/0274923 A1 | 10/2013 | By et al. |
| 2014/0009586 A1 | 1/2014 | McNamer et al. |
| 2014/0104490 A1 | 4/2014 | Hsieh et al. |
| 2014/0192253 A1 | 7/2014 | Laroia |
| 2014/0198188 A1 | 7/2014 | Izawa |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0326852 A1 | 11/2015 | Duparre et al. |
| 2016/0266284 A1 | 9/2016 | Duparre et al. |

FOREIGN PATENT DOCUMENTS

| | | |
|---|---|---|
| CN | 102375199 A | 3/2012 |
| EP | 840502 A2 | 5/1998 |
| EP | 2026563 A1 | 2/2009 |
| EP | 2336816 A2 | 6/2011 |
| GB | 2482022 A | 1/2012 |
| JP | 2006033493 A | 2/2006 |
| JP | 2007520107 A | 7/2007 |
| JP | 2011109484 A | 6/2011 |
| TW | 200828994 A | 7/2008 |
| WO | 2007083579 A1 | 7/2007 |
| WO | 2009151903 A2 | 12/2009 |
| WO | 2011063347 A2 | 5/2011 |
| WO | 2011116203 A1 | 9/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012082904 A1 | 6/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |

(56) References Cited

FOREIGN PATENT DOCUMENTS

| WO | 2013126578 A1 | 8/2013 |
|---|---|---|
| WO | 2014160142 A1 | 10/2014 |
| WO | 2015070105 A1 | 5/2015 |

OTHER PUBLICATIONS

Lensvector, "How LensVector Autofocus Works", http://www.lensvector.com/overview.html.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Muehlebach, "Camera Auto Exposure Control for VSLAM Applications", Studies on Mechatronics.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, 9 (Sep.), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Vuong et al., "A New Auto Exposure and Auto White-Balance Algorithm to Detect High Dynamic Range Conditions Using CMOS Technology".
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)".
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al., "A Self-Reconfigurable Camera Array", Eurographics Symposium on Rendering, 2004, 12.
Zomet et al., "Robust Super-Resolution", IEEE, 2001, pp. 1-6.
International Preliminary Report on Patentability for International Application PCT/US2013/046002, Report completed Dec. 31, 2014, Mailed Jan. 8, 2015, 6 Pgs.
International Preliminary Report on Patentability for International Application PCT/US2013/048772, Report completed Dec. 31, 2014, Mailed Jan. 8, 2015, 8 Pgs.
International Search Report and Written Opinion for International Application PCT/US2014/025904 report completed Jun. 10, 2014, Mailed Jul. 10, 2014, 6 Pgs.
Extended European Search Report for EP Application No. 13810429.4, Completed date Jan. 7, 2016, Mailed on Jan. 15, 2016, 6 Pgs.

(56) References Cited

OTHER PUBLICATIONS

Extended European Search Report for European Application EP13810229.8, Report Completed Apr. 14, 2016, Mailed Apr. 21, 2016, p. 7.
International Preliminary Report on Patentability for International Application PCT/US2014/025904, Report issued Sep. 15, 2015, Mailed Sep. 24, 2015, 5 Pgs.
International Preliminary Report on Patentability for International Application PCT/US2014/064693, Report issued May 10, 2016, Mailed May 19, 2016, 14 Pgs.
International Search Report and Written Opinion for International Application PCT/US2014/064693, Report Completed Mar. 7, 2015, Mailed Apr. 2, 2015, 15 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012 (Nov. 10, 2012). Retrieved from the Internet at URL:<http://citeseerx.ist.psu.edu/viewdoc/download?doi=10.1.1.226.2643&rep=rep1 &type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.

Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., Multiframe Demosaicing and Super-Resolution of Color Images, IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC'06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., Optical System Design, 2nd Edition, SPIE Press, pp. 191-198.
Fischer et al., Optical System Design, 2nd Edition, SPIE Press, pp. 49-58.
Hamilton, , "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.

(56) References Cited

OTHER PUBLICATIONS

Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
International Search Report and Written Opinion for International Application No. PCT/US13/46002, Search Completed Nov. 13, 2013, Mailed Nov. 29, 2013, 7 pgs.
International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application PCT/US11/36349, mailed Aug. 22, 2011, 12 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US2009/044687, completed Jan. 5, 2010, 13 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US12/37670, Mailed Jul. 18, 2012, Search Completed Jul. 5, 2012, 9 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200, 2011.
Bishop et al., "Light Field Superresolution", Retrieved from http://home.eps.hw.ac.uk/~sz73/ICCP09/LightFieldSuperresolution.pdf, 9 pgs.9.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.

\* cited by examiner

PASSIVE ALIGNMENT OF ARRAY CAMERA MODULES CONSTRUCTED FROM LENS STACK ARRAYS AND SENSORS BASED UPON ALIGNMENT INFORMATION OBTAINED DURING MANUFACTURE OF ARRAY CAMERA MODULES USING AN ACTIVE ALIGNMENT PROCESS

CROSS-REFERENCE TO RELATED APPLICATIONS

The current application claims priority to U.S. Provisional Application No. 61/772,443, filed Mar. 4, 2013, the disclosure of which is incorporated herein by reference.

FIELD OF THE INVENTION

The present invention generally relates to manufacturing array camera modules using active and passive alignment processes.

BACKGROUND

In response to the constraints placed upon a traditional digital camera based upon the camera obscura, a new class of cameras that can be referred to as array cameras has been proposed. Array cameras are characterized in that they include an imager array, or sensor, that has multiple arrays of pixels, where each pixel array is intended to define a focal plane, and each focal plane has a separate lens stack. Typically, each focal plane includes a plurality of rows of pixels that also forms a plurality of columns of pixels, and each focal plane is contained within a region of the imager that does not contain pixels from another focal plane. An image is typically formed on each focal plane by its respective lens stack. In many instances, the array camera is constructed using an imager array that incorporates multiple focal planes and an optic array of lens stacks.

SUMMARY OF THE INVENTION

Systems and methods in accordance with embodiments of the invention actively align a representative optic array of lens stacks with an imager array that includes multiple focal planes to form an array camera module, and subsequently passively aligns constituent optic arrays of lens stacks with constituent imager arrays based on data from the active alignment to construct array camera modules. In one embodiment, a method of aligning a plurality of lens stack arrays with a corresponding plurality of sensors, each sensor including a plurality of focal planes, where each focal plane includes a plurality of rows of pixels that also form a plurality of columns of pixels, and where each focal plane is contained within a region of the imager array that does not contain pixels from another focal plane, the method including: aligning a first lens stack array relative to a first sensor in an initial position, where the lens stack array includes a plurality of lens stacks and the plurality of lens stacks forms a separate optical channel for each focal plane in the first sensor; varying the spatial relationship between the first lens stack array and the first sensor; capturing images of a known target using a plurality of active focal planes within the first sensor at different spatial relationships between the first lens stack array and the first sensor, the known target including at least one region of interest; scoring the images captured by the plurality of active focal planes, where the resulting scores provide a direct comparison of the extent to which at least one region of interest is focused in the images; and aligning at least a second lens stack array relative to at least a second sensor, based on the scores of the images captured by the plurality of active focal planes of the first sensor and the corresponding spatial relationships by which the respective scored images were obtained.

In another embodiment, a method for aligning a plurality of focal planes, where each focal plane includes a plurality of rows of pixels that also form a plurality of columns of pixels, and where each focal plane is contained within a region of the imager array that does not contain pixels from another focal plane, includes: aligning a first lens stack array relative to a first sensor in an initial position, where the lens stack array includes a plurality of lens stacks and the plurality of lens stacks forms a separate optical channel for each focal plane in the first sensor; varying the spatial relationship between the first lens stack array and the first sensor; capturing images of a known target using a plurality of active focal planes within the first sensor at different spatial relationships between the first lens stack array and the first sensor, the known target including at least one region of interest; scoring the images captured by the plurality of active focal planes, where the resulting scores provide a direct comparison of the extent to which at least one region of interest is focused in the images; identifying a preferred spatial relationship for at least a second lens stack array relative to at least a second sensor, based on the scores of the images captured by the plurality of active focal planes of the first sensor and the corresponding spatial relationships by which the respective scored images were obtained, accounting for measured differences between the first lens stack array and the at least second lens stack array as well as measured differences between the first sensor and the at least second sensor; and affixing the relative location of the at least second lens stack array and the at least second sensor such that the identified preferred spatial relationship is realized.

DETAILED DESCRIPTION

Figure 1:
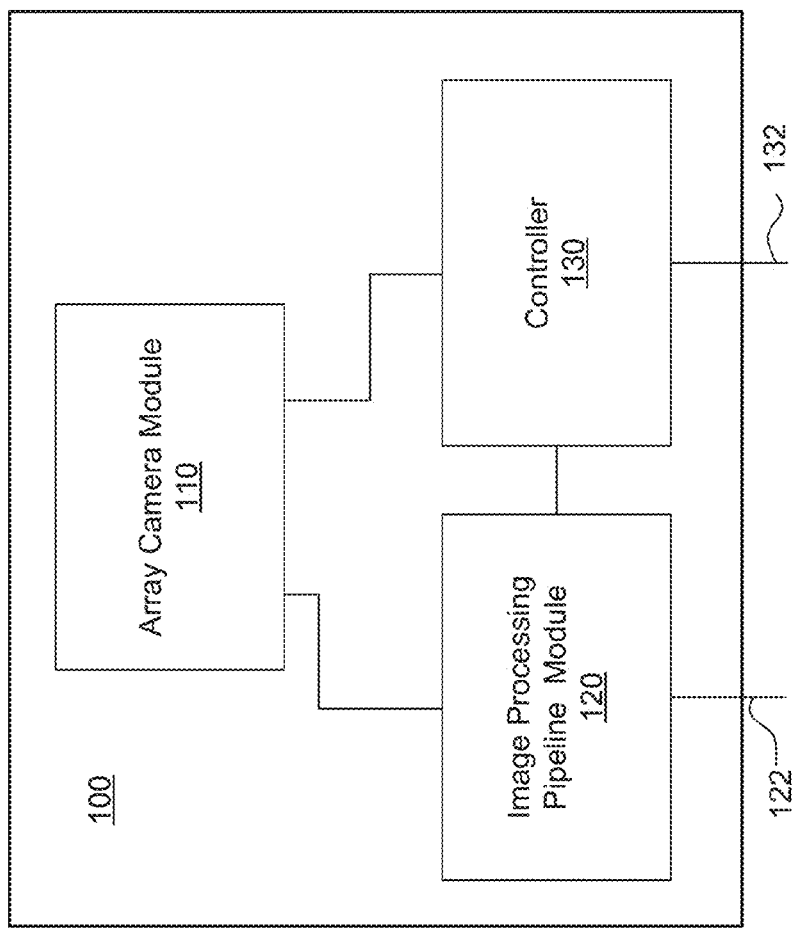
FIG. 1 conceptually illustrates an array camera.

Turning now to the drawings, systems and methods for actively aligning a representative optic array of lens stacks with a representative imager array, characterizing the active alignment, and using the characterization data to passively align similar optic arrays of lens stacks and imager arrays in accordance with embodiments of the invention are illustrated. Processes for constructing array camera modules using lens stack arrays are described in U.S. patent application Ser. No. 12/935,504, entitled "Capturing and Processing of Images Using Monolithic Camera Array with Heterogeneous Imagers", Venkataraman et al. The disclosure of U.S. patent application Ser. No. 12/935,504 is incorporated by reference herein in its entirety. The monolithic array camera modules illustrated in U.S. patent application Ser. No. 12/935,504 can be constructed from an optic array of lens stacks, also termed a 'lens stack array', where each lens stack in the array defines an optical channel, and where the lens stack array is associated with a monolithic imager array, or 'sensor', including a plurality of focal planes corresponding to the optical channels in the lens stack array. Each focal plane can include a plurality of rows of pixels that also forms a plurality of columns of pixels, and each focal plane may be contained within a region of the imager array that does not contain pixels from another focal plane. An image may be formed on each focal plane by a respective lens stack. The combination of a lens stack array and a sensor can be understood to be an 'array camera module' and the combination of an individual lens stack and its corresponding focal plane within the sensor can be understood to be a 'camera.' Ideally, the lens stack array of an array camera is constructed so that each lens stack has the same focal length. However, the large number of tolerances involved in the manufacture of a lens stack array can result in the different lens stacks having varying focal lengths. The combination of all the manufacturing process variations typically results in a deviation of the actual ("first order") lens parameters—such as focal length—from the nominal prescription. As a result, each lens stack can have a different axial optimum image location. And consequently, since the sensor may be monolithic, it typically cannot be placed a distance that corresponds with the focal length of each camera within an array camera module. There are a variety of processes in the manufacturing of conventional camera modules that can be utilized to align a lens stack array with a sensor to achieve acceptable imaging performance including active alignment processes and passive alignment processes.

In the context of the manufacture of camera systems, the term active alignment typically refers to a process for aligning an optical component or element (e.g. a lens stack array) with an image receiving component or element (e.g. comprising a monolithic sensor) to achieve a final desirable spatial arrangement by evaluating the efficacy of the imaging system's ability to capture and record images as a function of the spatial relationship between the optical component and the image receiving component, and using this evaluation information to assist in the aligning process. Typically, this process is implemented by using the imaging system to capture and record image data (typically of a known target) in real time as the optical component is moving relative to the image receiving component. As the optical component is moved relative to the image receiving component, the spatial relationship between the two changes, and the characteristics of the recorded image data also change correspondingly. This recorded image data may then be used in aligning the optical component relative to the image receiving component in a desired manner. For example, active alignment can generally be used to determine a spatial relationship that results in a camera module that is capable of recording images that exceed a threshold image quality. Processes for actively aligning a lens stack array with an array of focal planes are described in U.S. Patent Application Ser. No. 61/666,852, entitled "Systems and Methods for Manufacturing Camera Modules Using Active Alignment of Lens Stack Arrays and Sensors", Duparre et al. The disclosure of U.S. Patent Application Ser. No. 61/666,852 is incorporated by reference herein in its entirety.

Ideally, when manufacturing camera modules in bulk, each camera module would be individually assembled using a rigorous assembly process, such as an active alignment process, to provide a quality configuration. However, performing such processes in bulk may be costly and time-consuming. An alternative to the use of an active alignment process to manufacture camera modules is the use of a passive alignment process. The term passive alignment typically refers to aligning an optical component with an image receiving component to achieve a final desirable spatial arrangement using predetermined configuration parameters (e.g., the spacing between the lens stack array and the sensor is predetermined). In and of themselves, passive alignment processes can typically easily achieve a camera module that is in sufficient 'translational alignment,' i.e. the lens stacks of the lens stack array are lined up with their corresponding lenses (e.g. by using optical alignment marks also known as "fiducials" that are picked up by a vision system and used to guide the lateral alignment by (artificially=in software) overlaying the alignment marks of the one component with those of the complementary one.). Importantly, passive alignment processes may typically be implemented much more cost-effectively and much more rapidly than active alignment processes, since they typically do not involve iteratively, and laboriously, evaluating the efficacy of cameras during the alignment process, like active alignment processes do. However, precisely because passive alignment processes employ a less rigorous approach than active alignment processes, passive alignment processes, by themselves, may result in a less optimal configuration than that which can be achieved using an active alignment process because they cannot take into account material variations and/or tolerances.

Processes for aligning lens stack arrays with sensors in accordance with many embodiments of the invention involve actively aligning a representative lens stack array with a representative sensor that has a plurality of focal planes, noting the final configuration of the actively aligned lens stack array and sensor, developing passive alignment configuration parameters based on the initial active alignment process, and passively aligning the remaining similar lens stack arrays and sensors. In so doing, the deficiencies of the active alignment (e.g., expense and processing time) may be mitigated. These embodiments may rely on the notion that lens stack arrays and sensors produced from the same process (e.g. lens stack arrays fabricated on the same wafer, or alternatively lens stack arrays that are fabricated on different wafers that however are always from the same wafer location), may have similar characteristics such that alignment characteristics are determined for a lens stack array and sensor using an active alignment process may be similarly applicable in aligning the remaining lens stack arrays and sensors produced from the same process. Accordingly, similar lens stack arrays and sensors may be 'binned,' i.e. similar lens stack arrays may be aggregated together and similar sensors may be aggregated together. Thus, passive alignment configuration parameters may be developed using the alignment characterization data obtained from the active alignment, and may then be implemented in passively aligning the remaining similar lens stack arrays and imager arrays. Hence, the instances of potentially labor-intensive active alignment processes may be reduced.

In numerous embodiments, the back focal lengths in the representative lens stack array are measured, for example using an optics measuring tool such as one manufactured by TriOptics Optical Test Instrument of Wedel, Germany, and these back focal lengths are then related to the final spatial relationship in the actively aligned configuration. Thereafter, with this relationship known, the back focal lengths of the remaining lens stack arrays may be measured, a desired spatial relationship may be computed, and passive alignment configuration parameters can be developed in accordance with embodiments of the invention. Passive alignment processes can then be used to align the remaining lens stack arrays and corresponding sensors to form array camera modules using the derived configuration parameters in further accordance with embodiments of the invention. In many embodiments other suitable optical or mechanical measuring tools are used to measure other parameters, such as thickness of the sensor cover glass or air gap between the same and the sensor—in fact, any parameters where tolerances may be involved that have an effect on focusing in addition to the focal lengths measured e.g. by the TriOptics tool may be measured by the appropriate measuring tool in accordance with embodiments of the invention. Accordingly, passive alignment configuration parameters may be developed in view of these measurements.

Array cameras and systems and methods for using passive alignment processes to manufacture array camera modules using alignment information obtained during manufacture of array camera modules using an active alignment process in accordance with embodiments of the invention are discussed further below.

Array Camera Architectures

A variety of architectures can be utilized to construct an array camera using one or more array camera modules and a processor, including (but not limited to) the array camera architectures disclosed in U.S. application Ser. No. 12/935,504. A representative array camera architecture incorporating an array camera module and a processor is illustrated in FIG. 1. The array camera 100 includes an array camera module 110, which is connected to an image processing pipeline module 120 and to a controller 130. In the illustrated embodiment, the image processing pipeline 120 and the controller 130 are implemented using a processor. In various embodiments, the image processing pipeline module 120 is hardware, firmware, software, or a combination for processing the images received from the array camera module 110. The image processing pipeline module 120 is capable of processing image data captured by multiple focal planes in the camera module and can produce a synthesized higher resolution image using the captured image data. In a number of embodiments, the image processing pipeline module 120 provides the synthesized image data via an output 122.

In many embodiments, the controller 130 is hardware, software, firmware, or a combination thereof for controlling various operational parameters of the array camera module 110. The controller 130 receives inputs 132 from a user or other external components and sends operation signals to control the array camera module 110. The controller can also send information to the image processing pipeline module 120 to assist processing of the images captured by the focal planes in the array camera module 110.

Although a specific array camera architecture is illustrated in FIG. 1, camera modules constructed using active alignment processes in accordance with embodiments of the invention can be utilized in any of a variety of array camera architectures. Camera modules that can be utilized in array cameras and processes for manufacturing camera modules utilizing active alignment processes in accordance with embodiments of the invention are discussed further below.

Array Camera Modules

An array camera module may be formed by aligning a lens stack array and an imager array in accordance with embodiments of the invention. Each lens stack in the lens stack array may define a separate optical channel. The lens stack array may be mounted to an imager array that includes a focal plane for each of the optical channels, where each focal plane includes an array of pixels or sensor elements configured to capture an image. When the lens stack array and the imager array are combined with sufficient precision, the array camera module can be utilized to capture image data from multiple images of a scene that can be read out to a processor for further processing, e.g., to synthesize a high resolution image using super-resolution processing.

Figure 2:
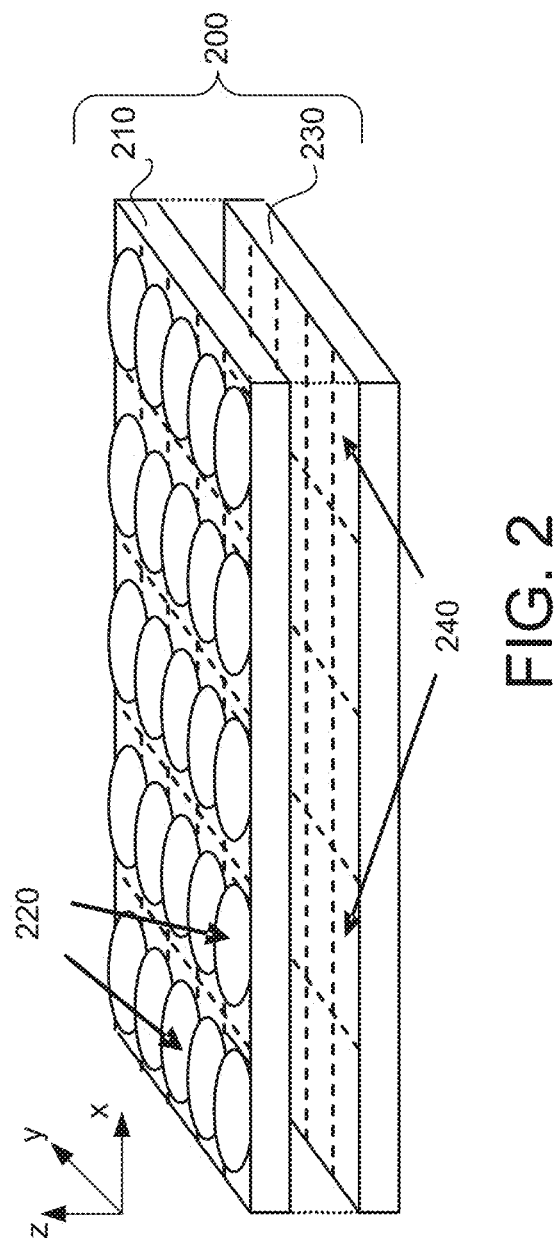
FIG. 2 illustrates an array camera module.
Figure 3:
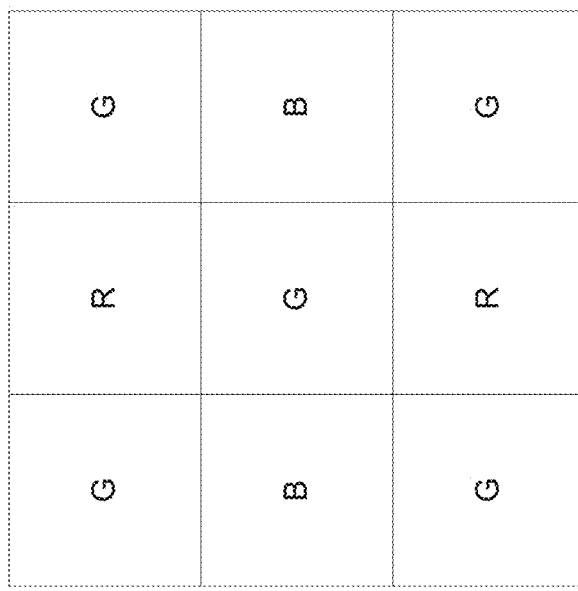
FIG. 3 illustrates an array camera module that employs a $\pi$ filter.

An exploded view of an array camera module formed by combining a lens stack array with a monolithic sensor including an array of focal planes in accordance with an embodiment of the invention is illustrated in FIG. 2. The array camera module 200 includes a lens stack array 210 and a sensor 230 that includes an array of focal planes 240. The lens stack array 210 includes an array of lens stacks 220. Each lens stack creates an optical channel that resolves an image on the focal planes 240 on the sensor. Each of the lens stacks may be of a different type. For example, the optical channels may be used to capture images at different portions of the spectrum and the lens stack in each optical channel may be specifically optimized for the portion of the spectrum imaged by the focal plane associated with the optical channel. More specifically, an array camera module may be patterned with "π filter groups." The term π filter groups refers to a pattern of color filters applied to the lens stack array of a camera module and processes for patterning array cameras with π filter groups are described in U.S. Patent Application Ser. No. 61/641,165, entitled "Camera Modules Patterned with π Filter Groups", Venkataraman et al. The disclosure of U.S. Patent Application Ser. No. 61/641,165 is incorporated by reference herein in its entirety. FIG. 3 illustrates a single π filter group, wherein 5 lenses are configured to receive green light, 2 lenses are configured to receive red light, and 2 lenses are configured to receive blue light. The lens stacks may further have one or multiple separate optical elements axially arranged with respect to each other.

A lens stack array may employ wafer level optics (WLO) technology. WLO is a technology that encompasses a number of processes, including, for example, molding of lens arrays on glass wafers, stacking of those wafers (including wafers having lenses replicated on either side of the substrate) with appropriate spacers, followed by packaging of the optics directly with the imager into a monolithic integrated module.

The WLO procedure may involve, among other procedures, using a diamond-turned mold to create each plastic lens element on a glass substrate. More specifically, the process chain in WLO generally includes producing a diamond turned lens master (both on an individual and array level), then producing a negative mould for replication of that master (also called a stamp or tool), and then finally forming a polymer replica on a glass substrate, which has been structured with appropriate supporting optical elements, such as, for example, apertures (transparent openings in light blocking material layers), and filters.

Although the construction of lens stack arrays using specific WLO processes is discussed above, any of a variety of techniques can be used to construct lens stack arrays, for instance those involving precision glass molding, polymer injection molding or wafer level polymer monolithic lens processes. Issues related to variation in back focal length of the lens stacks within lens stack arrays are discussed below.

Back Focal Plane Alignment

An array camera module is typically intended to be constructed in such a way that each focal plane (i.e. an array of pixels configured to capture an image formed on the focal plane by a corresponding lens stack) is positioned at the focal distance of each lens stack that forms an optical channel. However, manufacturing variations can result in the lens stack in each optical channel varying from its prescription, and in many instances, these variations can result in each lens stack within a lens stack array having a different focal length. For example, parameters that may vary amongst individual lens stacks in a lens stack array because of manufacturing variations include, but are not limited to: the radius of curvature in individual lenses, the conic, higher order aspheric coefficient, refractive index, thickness of the base layer, and/or overall lens height. As one of ordinary skill in the art would appreciate, any number of lens prescriptions may be used to characterize the lens fabrication process, and the respective tolerances may involve departures from these prescriptions in any number of ways, each of which may impact the back focal length. Due to the monolithic nature of the sensor, the spatial relationship of the focal planes (with respect to the lens stacks) cannot be individually customized to accommodate this variability.

Figure 4:
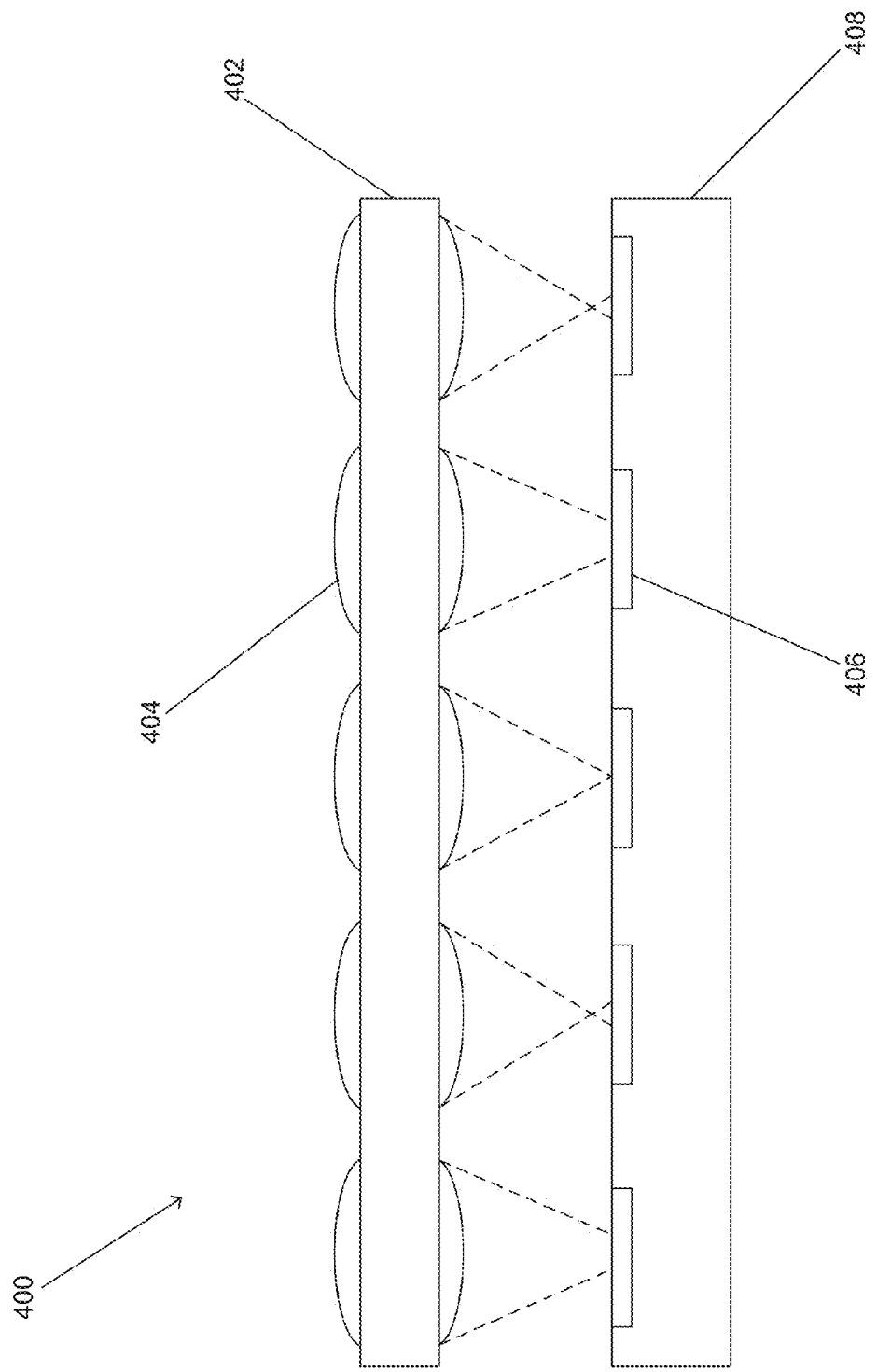
FIG. 4 conceptually illustrates variations in focal length that can occur during the manufacture of an array camera module using a lens stack array and a sensor in accordance with embodiments of the invention.

The variations in focal length that can occur in a conventional lens stack array are conceptually illustrated in FIG. 4. The array camera module 400 includes a lens stack array 402 in which lens stacks 404 focus light on the focal planes 406 of sensor 408. As is illustrated, variance between the actually fabricated lens stack and its original prescription can result in the lens stack having a focal length that varies slightly from its prescription and consequently an image distance that does not correspond with the distance between the lens stack array and the sensor. Accordingly, the images formed on the focal planes of the sensor can be out of focus. In addition, other manufacturing tolerances associated with the assembly of the array camera module including (but not limited to) variations in spacer thickness and alignment of the lens stack array relative to the sensor can impact all of the optical channels.

Active and passive alignment processes may be used in conjunction to mitigate problems associated with the variations in focal length or other thickness tolerances, and this is discussed in greater detail below.

Active Alignment Processes

Figure 5:
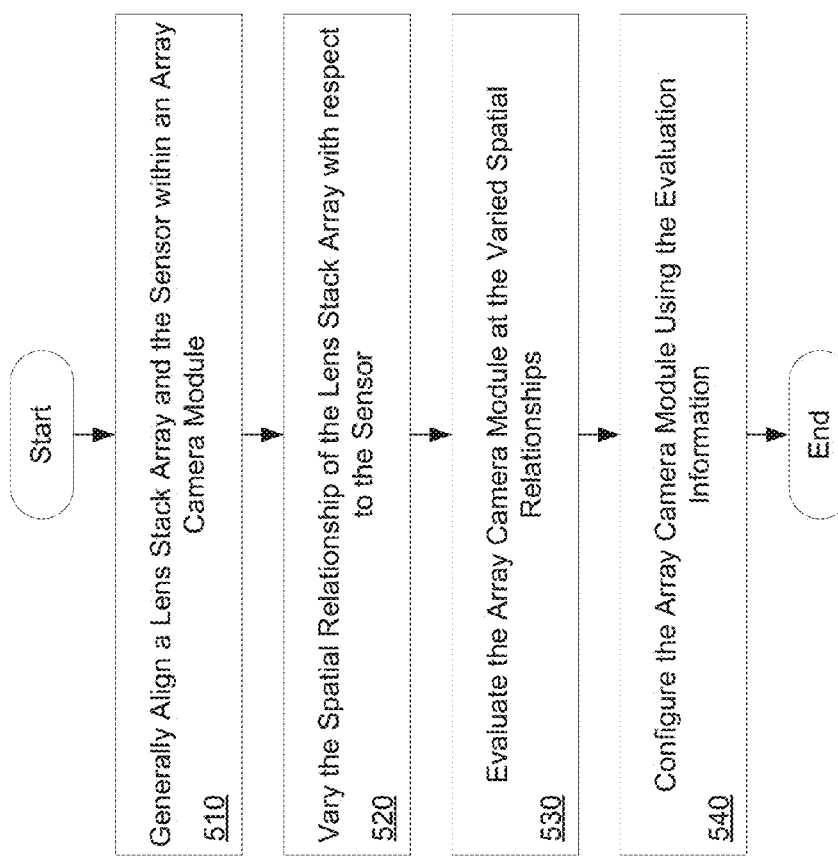
FIG. 5 is a flowchart that illustrates a process for actively aligning a lens stack array and a sensor including an array of corresponding focal planes in accordance with an embodiment of the invention.

As noted above, systems and methods in accordance with several embodiments of the invention can utilize an active alignment processes to manufacture one or more array camera modules, from which alignment information can be obtained for use in the manufacture of array camera modules using passive alignment processes. In many embodiments, processes for actively aligning a lens stack array with a sensor to construct an array camera module involve reading image data captured by multiple focal planes on the sensor as the lens stack array is moved relative to the sensor. The image data can be utilized to evaluate the resulting image quality at different spatial relationships between the sensor and the lens stack array and the spatial relationship that provides a predetermined threshold level of image quality can be utilized to construct the camera module. A process that actively aligns a lens stack array with a sensor by generally aligning the two, varying their spatial relationship, evaluating the resulting configuration during the variation, and configuring the array camera module using the evaluation data in accordance with an embodiment of the invention is illustrated in FIG. 5.

A lens stack array is generally aligned (510) with a corresponding sensor that has multiple focal planes. The combination is aligned so that each camera within the configuration is capable of capturing and recording images. The spatial relationship of the lens stack array with respect to the sensor is varied (520). In several embodiments, the variation is achieved by sweeping the lens stack array with respect to the sensor. Sweeping can be understood to mean moving one component (i.e. either the lens stack array or the sensor) in relation to the other over time. Sweeping may be in one degree of freedom or it can be across many degrees of freedom. As can readily be appreciated, the array nature of the camera module means that variations in the x, y, and z-directions, and tip/tilt and rotation of the lens stack array with respect to the sensor can all have significant impact on the imaged data captured by the focal planes on the sensor. Note that in many array cameras, focus and consequently sharpness of the cameras is primarily affected by the z-direction and the tip/tilt of the lens stack array with respect to the sensor, with the tip/tilt principally affecting the performance of the corner cameras. Conversely, in a conventional camera that comprises only a single lens stack, the image quality of the camera is primarily driven by the optical system's 'z-position' with respect to the sensor. In many embodiments, the path of the sweep is predetermined.

The quality of the captured image data is evaluated (530) at the varied spatial relationships. For example, in several embodiments of the invention, the configuration is intermittently evaluated during a sweep of the lens stack array with respect to the sensor. In many embodiments, the configuration is evaluated by evaluating multiple cameras' captured and recorded images of a known target at the varied spatial relationships. In several embodiments, only a subset of the configuration's cameras is used for evaluation purposes. An MTF score may be determined for each recorded image and used to evaluate a respective camera at a respective spatial orientation. The recorded images may also be evaluated at its different ROIs. For example, an MTF score may be assigned to each ROI within a recorded image.

The array camera module is configured (540) using the information obtained during evaluation. In some embodiments, the configuration involves concluding a spatial relationship between the lens stack array and the sensor that results in the corresponding array camera module being able to capture and record images that exceed a threshold quality.

The configuration may also involve disabling cameras that do not surpass a threshold quality. Again, because array camera modules include a plurality of cameras, they can still function even when one or more of the cameras are disabled. The advantage of being able to disable a camera is that the average performance of the array including the camera may be much lower than the average performance of the remaining cameras when the disabled camera is excluded from consideration in determining the appropriate alignment of the lens stack array and sensor.

Although a process, and its variants, that actively aligns a lens stack array with a corresponding array of focal planes has been described, any of a number of different processes may be used to actively align a lens stack array with an array of focal planes to obtain alignment information that can be used to manufacture array camera modules using passive alignment processes in accordance with embodiments of the invention. An initial configuration for an active alignment process in accordance with embodiments of the invention is discussed below.

Figure 6:
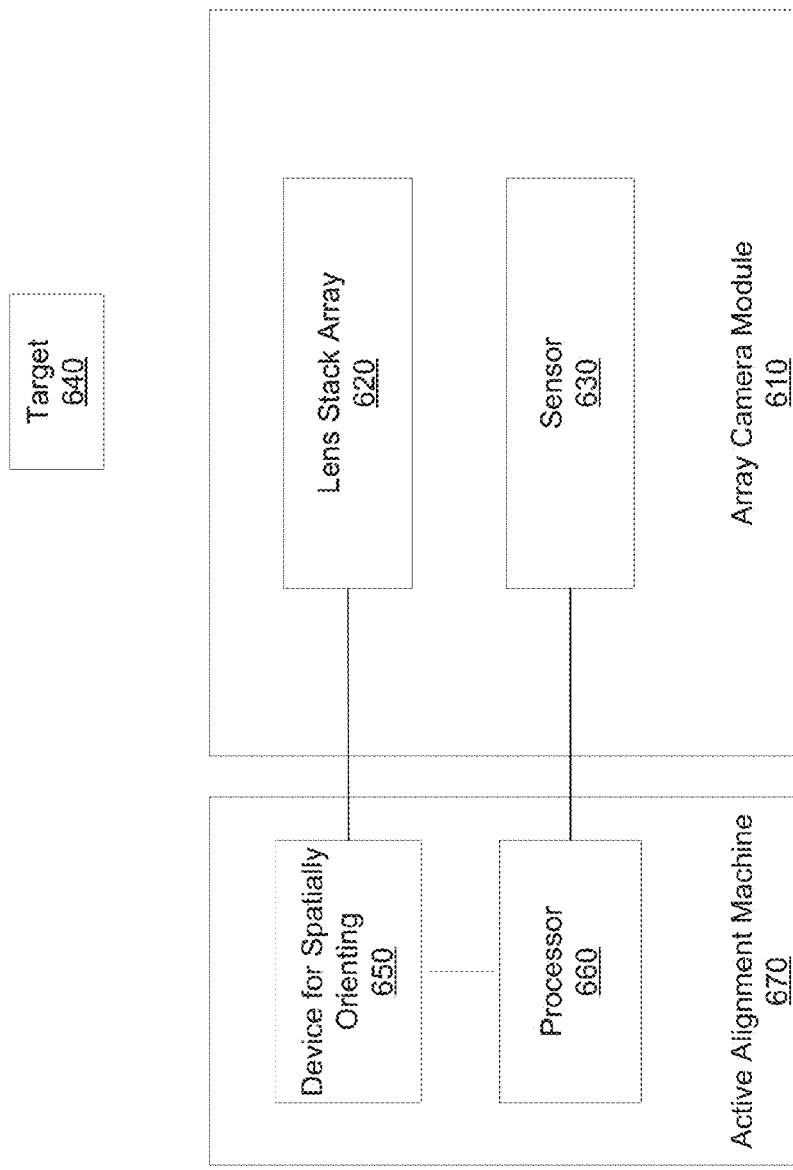
FIG. 6 schematically illustrates an initial configuration that may be used to actively align a lens stack array with a sensor in accordance with an embodiment of the invention.

Initial Configuration for Actively Aligning a Lens Stack Array with an Array of Focal Planes Active alignment processes may begin from any number of initial configurations in accordance with embodiments of the invention. An initial configuration for an active alignment process where a device that is capable of orienting a lens stack array is connected to a lens stack array of a corresponding array camera module, a processor is connected to the corresponding sensor, and a target is positioned and illuminated so that the array camera module can capture and record it in accordance with an embodiment of the invention is illustrated in FIG. 6. The array camera module 610 includes a lens stack array 620 and a sensor 630 that has corresponding focal planes. The lens stack array and the sensor are generally aligned so that they are capable of capturing and recording images of the target 640. A device that is capable of spatially orienting the lens stack array 640 is connected to the lens stack array 620, and a processor 660 is connected to the sensor. Thus, the processor 660 is capable of capturing and recording images from the sensor 630, while the orientation of the lens stack array 620 is being varied, and the active alignment process can thereby be implemented. The combination of the device for spatially orienting the lens stack array 650 and the processor 660 can be understood to be an active alignment machine 670.

In many embodiments, the initial configuration involves generally aligning the lens stack array 620 and the sensor 630 so as to ensure that the lens stack array 620 and the sensor 630 are in sufficient translational and rotational alignment such that each lens stack is generally aligned with its corresponding focal plane. Translational motion here refers to motion of a system (i.e. the lens stack array 620 or the sensor 630) in a direction parallel to its respective surface. Rotation here refers to rotation of a system about the Z-axis (i.e. the axis defining the distance between the sensor and the lens stack array) relative to the other. General alignment may be achieved by, for example, monitoring a central feature on a test chart, and moving either the lens stack array or the sensor in translation (with respect to the other system) such that the central feature is centrally located within the central camera modules; this would indicate that the systems are in sufficient translational alignment. Either system may then be rotated with respect to the other so that the midpoints of each lens stack array and its corresponding focal plane define a line that runs generally parallel to the Z-axis. During this rotational adjustment, the systems may also be readjusted to preserve (or enhance) adequate translational alignment. In this way, each lens stack array may be generally aligned with its corresponding focal plane.

Although many embodiments of the invention employ the initial configuration illustrated in FIG. 6, many other embodiments employ other initial configurations appropriate to the requirements of specific applications. In accordance with embodiments of the invention, any initial configuration may be implemented that allows the spatial relationship between the lens stack array and the sensor to be varied, and further allows the corresponding array camera module to be evaluated, manipulated, and configured based on an evaluation of it. The varying of spatial relationships between the lens stack array and the sensor in accordance with embodiments of the invention is discussed below.

Figure 7:
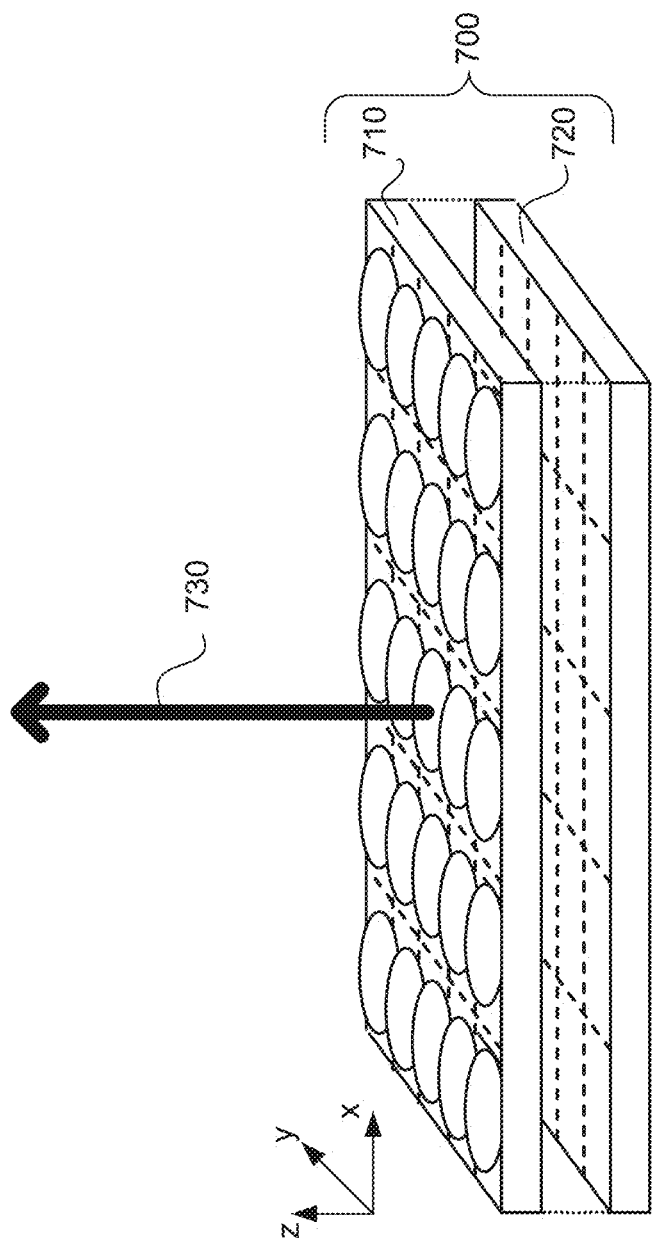
FIG. 7 illustrates sweeping a lens stack array with respect to a sensor in accordance with an embodiment of the invention.

Varying the Spatial Relationship of the Lens Stack Array with Respect to the Sensor The spatial relationship between a lens stack array and a corresponding sensor may be varied in any number of ways. For example, an active alignment process where a lens stack array is swept in a direction substantially normal to the sensor's planar surface in accordance with embodiments of the invention is illustrated in FIG. 7. An array camera module 700 includes a lens stack array 710 and a corresponding sensor 720 with an array of focal planes, and the active alignment process sweeps the lens stack array 710 in a predetermined direction 730 substantially normal to the sensor's surface (the z-direction). Note that sweeping the lens stack array in this fashion systematically varies the focus of each camera—typically cameras will be swept in focus and then out of focus. The array camera module may be evaluated on the varied spatial relationships along this sweep. Active alignment processes in accordance with embodiments of the invention can also include tipping, tilting, and/or rotating the lens stack array with respect to the sensor. In many embodiments, only the distance between the lens stack array and the sensor is varied in a sweep referred to as a "through focus sweep" and all relevant calculations to determine the optimum alignment (including centering as well as focus and tip/tilt) are made from images captured during the through focus sweep using the respective curve fittings and center of gravity calculations, respectively. As can be appreciated, a through focus sweep of a skewed lens stack array already provides information about the optimum tip/tilt of the lens stack array relative to the sensor by the appropriate plane fitting calculations of the peak focus positions or equalized MTF, respectively. These calculations are discussed further below.

In several embodiments, the manner in which the spatial relationship varies is computationally determined. For example, the manner in which the spatial relationship varies may be determined computationally based upon an initial evaluation of the array camera module. Additionally, the manner in which the spatial relationship varies may change during an active alignment process. For instance, after the lens stack array has been swept in a direction substantially normal to the sensor's planar surface, a processor may compute a different sweeping path that may facilitate a better configuration of the array camera module.

Although several examples have been described related to how the spatial relationship between the lens stack array and the sensor may be varied, the spatial relationship may also be varied in any number of other ways in accordance with embodiments of the invention. The evaluation of the array camera module at the varied spatial relationships is discussed below.

Evaluating the Array Camera Module

In numerous embodiments, evaluating the array camera module during the active alignment process involves having multiple cameras capture and record images of a known target, and evaluating these images. The images may be evaluated by assessing their focus, for example. The assessment of the focus may be performed in any number of ways in accordance with embodiments of the invention. For example, in many embodiments, an MTF score may be determined for a given recorded image. Generally speaking, an MTF score is an advantageous metric insofar as MTF scores amongst different cameras can be directly compared with one another. In some embodiments, a recorded image may be given a 'focus score' which can similarly be used to evaluate the recorded image. For example, a focus score may be determined by convolving a kernel over contrasting features in an image, where the resulting value is related to the camera's ability to focus. Unlike the MTF score, a focus score may not necessarily be directly comparable to such scores from different cameras; instead a focus score may be more useful in evaluating a single camera.

The selection of which scoring metric to use may be determined, in part, by the speed in which the scores can be calculated. For instance, if it takes longer to compute an MTF score than to compute a focus score, the focus score may be used in the evaluation. The selection of which scoring metric to use may also be determined, in part, by the accuracy and precision of the score. For instance, if the MTF score is a more precise means for evaluating image quality, then it may be used to evaluate the camera images. Moreover, the active alignment process may utilize several methods of evaluating a recorded image, and these methods may not necessarily be concurrent. For example, an evaluation based on focus scoring may be initially used, whereas an evaluation based on an MTF score may later be used. Additionally, the active alignment process may involve relating the different scoring metrics. For example, focus scoring may be used to evaluate the set of images recorded by an array camera, and MTF scoring may be used to evaluate a representative subset of those images. The MTF scores for the subset may then be normalized to the respective focus scores. And this determined relationship may be used to determine MTF scores for the remaining images.

Figure 8:
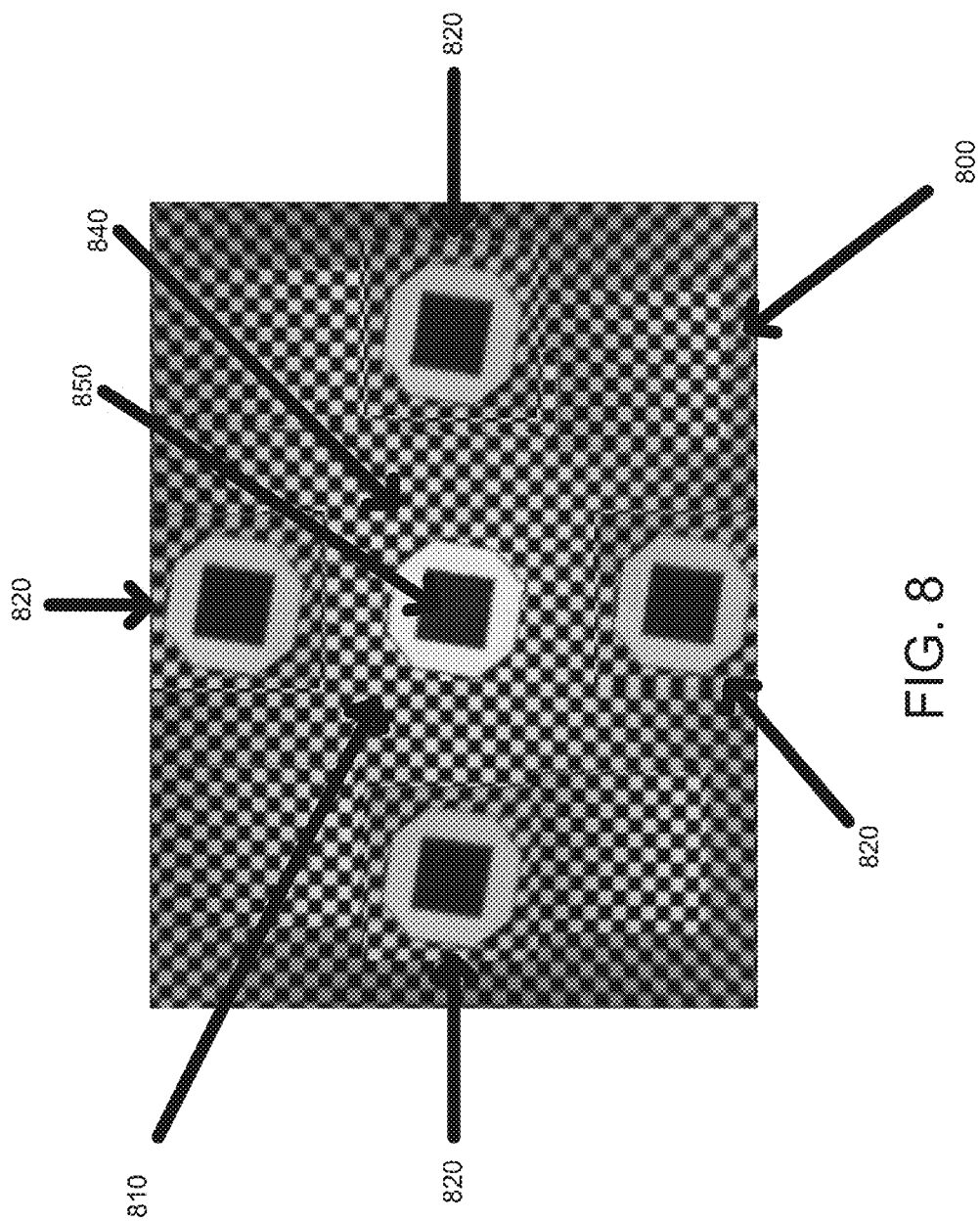
FIG. 8 illustrates a target that may be used during active alignment in accordance with many embodiments of the invention.

Additionally, different regions of recorded images may be evaluated, thereby providing information on a camera's quality as to specific regions. For example, in certain embodiments, images are recorded of a known target that has multiple "Regions of Interest" (ROIs), and the cameras' recorded images of the known target are evaluated with respect to each region of interest. FIG. 8 illustrates a known target used in accordance with many embodiments of the invention. The known target 800 includes a central feature 810 that highlights a central ROI, also known as an "on-axis" ROI. The known target further includes features 820 that highlight "off-axis" ROIs. The target in FIG. 8 is advantageous in so far as the edges of the features are oriented in such a way that the tangential and sagittal components of the MTF score, and thus also the astigmatism, can be directly derived and compared to prior lens test data. Thus, many embodiments utilize the known target illustrated in FIG. 8 by evaluating the quality of each camera with respect to each of the five ROIs.

The target illustrated in FIG. 8 may also be used in determining a focus score. Specifically, the determination of a focus score in conjunction with this target may involve convolving a kernel over areas of the image with contrasting features for each region of interest (e.g. the checkerboard patterns 840 or the dark slanted square against the light background 850), wherein the resulting value is proportional to the contrast between the features. For example, the following convolution kernel may be employed:

|−1, −1, −1, −1, −1|
|−1, −1, −1, −1, −1|
|−1, −1, 24, −1, −1|
|−1, −1, −1, −1, −1|
|−1, −1, −1, −1, −1|

This convolution kernel will yield values that are proportional to a camera's ability to resolve contrast. Note that the value will either be positive or negative depending on whether the region being evaluated is transitioning from light to dark or dark to light. However, whether a region of interest is transitioning from light to dark or vice versa is irrelevant to a camera's ability to focus; therefore the absolute value of these values should be obtained. Then, a focus score for each ROI may be obtained by averaging these absolute values for each ROI. Although FIG. 8 illustrates a particular known target that may be used in accordance with embodiments of the invention, many other embodiments utilize other known targets appropriate to the requirements of specific applications. For instance, the off-axis ROIs may be placed in the corners of the target—this allows the performance of the camera to be tested at larger field heights. In the illustrated embodiment, the ROIs have the advantage that the edges of the features are oriented in such a way that the tangential and sagittal components of the MTF and thus also the astigmatism can be directly derived and compared to prior lens test data. Moreover, although specific examples of how a focus score may be generated are provided, any of a variety of techniques can be used to generate a focus score. More generally, the evaluation techniques herein described are merely illustrative. Any techniques for evaluating the efficacy of an array camera module may be incorporated in accordance with embodiments of the invention. Using the evaluation data to configure the array camera module is discussed below.

Configuring the Array Camera Module

Evaluation data may be used to configure the array camera module in a number of respects. In many embodiments the array camera module is configured to minimize the detrimental impact caused by variance of focal length within a lens stack array. As described above, variance within a lens stack array may be caused by manufacturing process variations including (but not limited to) those that affect the following parameters: the radius of curvature in individual lenses, the conic, higher order aspheric coefficient, refractive index, thickness of the base layer, and/or overall lens height. Additionally, as described above, the following manufacturing variations related to the fabrication of multiple lens stack arrays and camera modules may further exacerbate the variability in back focal lengths: the thickness of the lens substrates and spacers employed in the stack, especially those toward the sensor cover glass, the thickness of the sensor cover glass used, bond line thickness between the lens spacer and the sensor cover glass, and any air gap between the sensor and the sensor cover glass. Thus, many embodiments evaluate the quality of each camera as a function of its spatial relationship to the sensor; thereafter, the information is used to orient the lens stack array with respect to the sensor so that any deterioration in the quality of the array camera due to the variance in focal length within the lens stack array is lessened.

Several embodiments generate mathematical equations that approximately characterize data related to camera quality as a function of spatial relationship, and use the derived equations to compute a desired spatial relationship that lessens the detrimental impact of variance in focal length. For example, some embodiments generate polynomial equations that approximately model the focal scoring data. Note that because of the nature of optics, each lens will typically have a peak focal value, and therefore polynomial equations are well suited to characterize the data. In many embodiments, the polynomial equations are generated by determining coefficients for predetermined generic polynomial equations (i.e. those with undetermined coefficients), such that the resulting equation approximately characterizes the data relating the camera quality to the spatial relationship. Many embodiments then use these derived equations to compute a best fit plane that characterizes a spatial relationship that reduces the detrimental impact of variance in focal length.

Notably, the best-fit planes may be computed in any number of ways. For instance, the best-fit plane may be computed to be a plane that includes an approximation of the peak values of the polynomial equations that characterize focal scoring data as a function of the spatial relationship. But, as described above, focal scoring data may not necessarily be directly comparable across different cameras. Therefore, best-fit planes may also be computed by generating equivalent MTF scores, and determining a plane that maximizes the mean MTF score while minimizing its variance. Specifically, the best-fit planes may be computed to determine a plane wherein the MTF scores amongst the different lens stacks are equalized within some specified tolerance. Moreover, any number of balancing algorithms may be employed to effectuate this computation as appropriate to the requirements of a specific application. The determination of these planes may then be used to facilitate the configuration of the array camera module.

In several embodiments, the configuration process involves orienting the lens stack array with respect to the sensor to form an array camera module that is capable of achieving pictures that have desired characteristics. In some embodiments, the lens stack array is oriented with respect to sensor so as to achieve an array camera module that is capable of recording images, wherein the quality of the on-axis aspects of the recorded image exceeds a specified threshold criterion. In several embodiments, the lens stack array is actively aligned with respect to the sensor to achieve an array camera module that is capable of recording images, wherein the quality of the off-axis aspects of the recorded image exceeds a specified threshold criterion. Note also that in various embodiments, the configuration process may involve disabling cameras that are above a certain threshold quality so as to avoid biasing the best fit plane determination. In numerous embodiments, the lens stack array is actively aligned with respect to the sensor to achieve an array camera module that is capable of recording images, wherein the quality of both on-axis and off-axis regions of interest exceed respective specified threshold qualities.

In many embodiments, the configuration process involves disabling cameras that perform above or below a certain defined threshold quality. Again, because an array camera module has many cameras, it is possible for it to maintain functionality even when some of its cameras are non-functional. In several embodiments, cameras are disabled when their quality, as determined by their ability to focus sharply when in a given spatial orientation, is above or below a threshold value. For example, some embodiments determine whether a camera should be disabled by evaluating an MTF score of its respective recorded images. In many embodiments, if the number of disabled cameras exceeds a specified value, then the array camera module is designated unacceptable. In several embodiments, different threshold values can be specified for different types of cameras within the array camera module. For example, in a number of embodiments that employ π filter groups, different threshold values can be specified for the green cameras, the red cameras, and the blue cameras.

In various embodiments, information obtained during the evaluation aspect of the active alignment process is used to configure the functionality of the each camera. For example, if it is determined that a particular camera has a focal length that makes it better suited to record images of objects that are at a further distance, the array camera module can be configured to rely more heavily on that camera when synthesizing recorded images of objects at further distances.

The above descriptions regarding configuring an array camera module in accordance with embodiments of the invention is not meant to be exhaustive. Indeed, array camera modules can be configured in any number of ways based on evaluations of the configuration in accordance with embodiments of the invention. Active alignment processes that configure array camera modules so that they are capable of capturing and recording images that have desirable image properties are discussed below.

Figure 9:
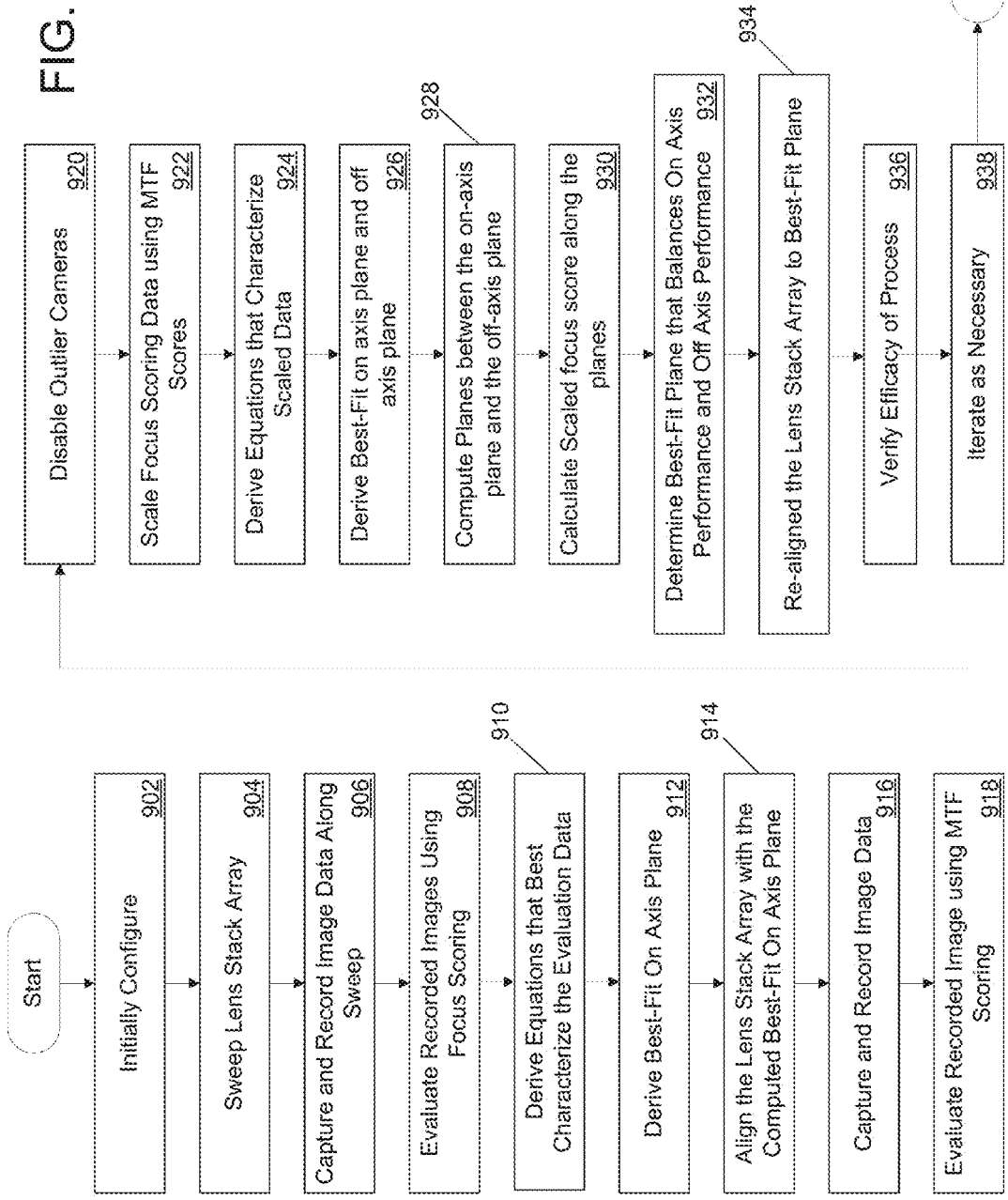
FIG. 9 is a flowchart that illustrates an active alignment process that uses an iterative computation process to yield an array camera module that is capable of capturing and recording images that have sufficient on-axis and off-axis performance in accordance with an embodiment of the invention.

Active Alignment Processes that Yield Array Camera Modules Capable of Recording Images that have Desirable Characteristics Active alignment processes in accordance with embodiments of the invention can use a variety of metrics to evaluate the image data that is captured during the active alignment process. In several embodiments, the active alignment process can optimize image quality in specific regions of the captured images, can optimize image quality in multiple regions of interest and/or can utilize a variety of metrics including (but not limited to) focus scoring and MTF scoring. An active alignment process that uses an iterative computation process to yield an array camera module that is capable of capturing and recording images that have sufficient on-axis and off-axis performance in accordance with an embodiment of the invention is illustrated in FIG. 9.

The process is initially configured (902) so that a lens stack array and a corresponding sensor are mounted to an active alignment machine in a manner similar to that seen in FIG. 6, so that they are generally operable as an array camera. This may include generally aligning the lens stack array with its corresponding sensor, which itself may include verifying that the lens stack array and the sensor are in sufficient rotational alignment such that each lens stack is generally aligned with its corresponding focal plane, as described above. A known target with an on-axis ROI and off-axis ROIs (similar to that depicted in FIG. 8) is positioned and illuminated so that the array camera module may capture and record its image. The initial configuration may also include deactivating specific cameras in a predetermined fashion so that they do not record images during the alignment process.

The lens stack array is swept (904) in a direction normal to the sensor's planar surface, in a manner similar to that seen in FIG. 7, and may be swept for a predetermined distance. During the sweep, the active cameras intermittently capture and record (906) images of the known target. The processor evaluates (908) the recorded images and assigns a 'focus score' for each region of interest in each recorded image for each camera. Polynomial equations are derived (910) for each region of interest captured by each camera that best characterizes the focus score as a function of the camera's distance from the sensor. In some embodiments, the polynomial equations are derived by calculating coefficients for a given a predetermined generic polynomial equation (i.e. a polynomial equation with undetermined coefficients). The polynomial equations will typically have a peak value.

An "on-axis best fit plane" is derived (912) using the peak values of the polynomial equations. The on-axis best fit plane, is characterized in that it maximizes the peak values corresponding to the active cameras and/or minimizes the variance in the peak values.

The lens stack array is then aligned (914) with the computed best fit on-axis plane. Each active camera captures and records (916) an image of the known target. Each recorded image is then evaluated (918) by determining an MTF score for each ROI. Cameras that do not meet a threshold MTF score are disabled (920). For example, any cameras that do not have an MTF score within 20% of the median on-axis MTF score may be disabled, and subsequently excluded from further alignment position calculations. This threshold may of course be configurable. In other embodiments, other criteria are utilized to determine which cameras should be disabled. Moreover, if a specified number of cameras are disabled, the array camera is deemed unacceptable.

Assuming the camera is not deemed unacceptable, the previously acquired focus scoring data is scaled (922) using the peak focus score and MTF scores. For example, the MTF Score may be scaled in accordance with the following formula:

$$\text{Scaled Focus Score}_z = (\text{Focus Score}_z/\text{Peak Focus Score})*\text{MTF Score}$$

where the z subscript reflects the score at a particular z-position.

The focus scoring data (absolute values) are exposure/signal-level dependent. Thus different cameras (e.g. blue, green, red cameras) will have different absolute focus score peak values due to their different signal levels. However, MTF is a metric that is invariant to signal level. Thus, MTF enables the curves for focus score to be normalized such that the curve derived from focus score can also be used to compare each camera's peak performance and not only the position at which peak performance occurs. In other embodiments, any of a variety of metrics appropriate to a specific application can be utilized in determining camera peak performance.

As before, polynomial curves may then be derived (924) that characterize the scaled focus scores. Thus, each active camera will be characterized by polynomial equations that characterize the camera's ability to resolve each respective region of interest. Given these new polynomial equations, a best-fit on axis plane and a best-fit off axis plane are derived (926); in this instance, the best-fit planes are characterized in that they approximately maximize the mean MTF scores while minimizing their variance. A configurable number of planes that are evenly spaced between the two best-fit planes (on-axis and off-axis) are computed (928). Scaled focus scores for each camera at their respective corresponding positions along each of those planes are calculated (930). A best-fit plane determined (932) wherein any deviation toward the best-fit off axis plane causes a gain in the off-axis scaled focus score and a loss in the on-axis scaled score, wherein the ratio of the off-axis score gain to the on-axis score loss falls below a configurable threshold. The lens stack array is then re-aligned (934) with this computed plane.

The efficacy of the process is verified 936. This may be accomplished by, for example, having each active camera record an image of the known target, determining an MTF score for each ROI within that image, and ensuring that each MTF score surpasses some threshold calculation.

The processes described may be iterated (938) until a desired configuration is achieved.

Although a particular process, and its variants, is discussed above, any number of processes may be used to achieve an array camera module that is capable of capturing and recording images that have adequate on-axis and off-axis performance in accordance with embodiments of the invention. Moreover, although the discussed process regards adequately balancing on-axis and off-axis performance of an array camera module, active alignment processes can be tailored to achieve any number of desirable picture characteristics in accordance with embodiments of the invention.

Furthermore, active alignment processes, including any of the above-described active alignment processes, may be used to derive alignment information from which configuration parameters can be derived for use in the manufacture of similar array camera modules using passive alignment processes, and this concept is discussed below.

Incorporating Passive Alignment in the Bulk Manufacture of Array Camera Modules

Passive alignment processes in accordance with embodiments of the invention may be utilized in the bulk manufacture of array camera modules based on configuration parameters derived from alignment information obtained from one or more similar array camera modules manufactured using active alignment processes. Specifically, in numerous embodiments, alignment information is obtained by actively aligning one or more representative lens stack array(s) and sensor(s). The alignment information can then be used to derive configuration parameters that are utilized in the passive alignment of a plurality of lens stack arrays and sensors that are similar to the representative lens stack(s) and sensor(s). Lens stack arrays and sensors that are formed on the same respective wafers, or alternatively are formed in the same positions on different wafers, may be sufficiently similar such that an alignment configuration determined during the active alignment of the representative lens stack array and the imager array may be similarly effective across the remaining lens stack arrays and sensors. Alternatively, if the representative lens stack array and sensor deviate from the remaining lens stack arrays and imager arrays in a known manner, the passive alignment parameters may be developed accordingly in view of the known extent of the deviation. Thus, in many embodiments, a preferred spatial relationship for lens stack arrays and sensors is identified based on the images obtained and evaluated for an actively aligned representative lens stack array and sensor, and if desirable, also based on measured differences between the actively aligned lens stack array and sensor and remaining constituent lens stack arrays and sensors. The lens stack arrays and sensors may then be affixed in the identified desired spatial relationships. In many embodiments, configuration parameters for passively aligning and affixing lens stack arrays and sensors account for the possibility that the bonding processes used to adjoin the passively aligned lens stack arrays and sensors may differ than those for the actively aligned lens stack array and sensor. Thus, the passively aligned lens stack arrays and sensors may require a different initial spacing prior to bonding in order to achieve the desired spatial relationship.

Figure 10:
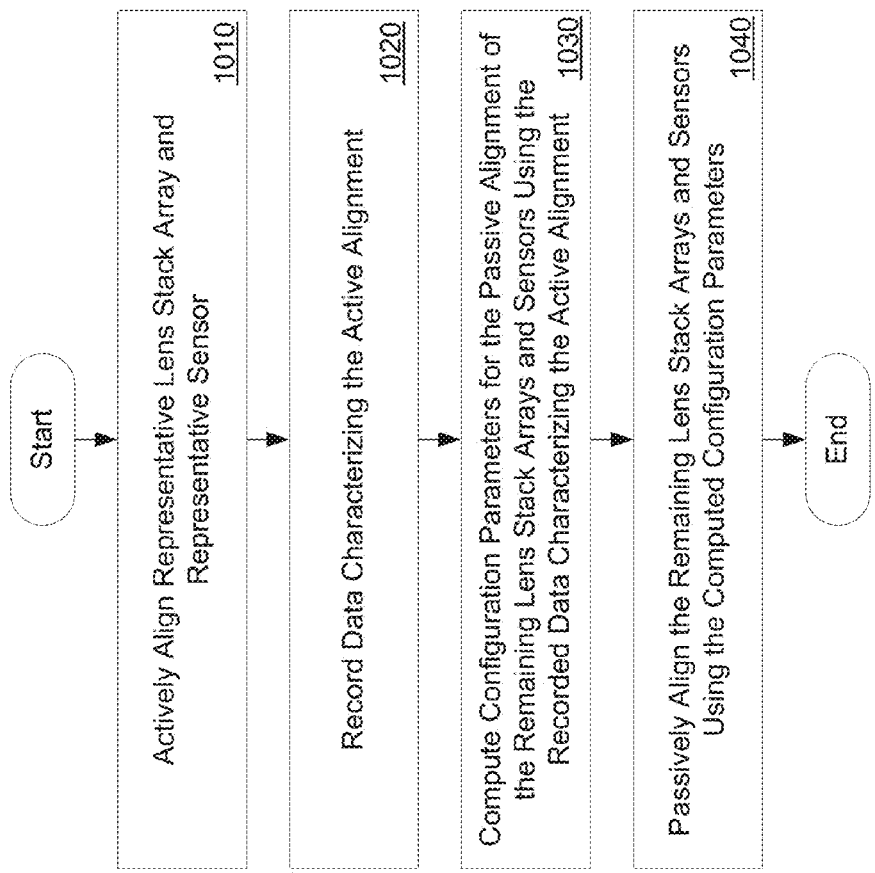
FIG. 10 illustrates a process for actively aligning a representative optic array of lens stacks with a representative imager array, characterizing the active alignment, and using the characterization data to passively align similar optic arrays of lens stacks and imager arrays in accordance with embodiments of the invention.

A process that aligns a plurality of lens stack arrays and sensors by actively aligning a representative lens stack array and a representative sensor, recording data characterizing the active alignment, computing configuration parameters for the passive alignment of the remaining lens stack arrays and sensors using the recorded data, and passively aligning the lens stack arrays and sensors using the computed parameters is illustrated in FIG. 10.

A representative lens stack array is actively aligned (1010) with a corresponding representative sensor that has multiple focal planes. Any active alignment process may be employed, including (but not limited to) any of the above-described active alignment processes. In many embodiments, the representative lens stack arrays and sensors are found to be sufficiently similar to their respective constituents, such that it can reasonably be expected that the final configuration achieved by actively aligning the representative lens stack array and the sensor may reasonably be expected to apply just as effectively to the remaining lens stack arrays and sensors. For example, lens stack arrays and sensors formed on the same respective wafers, may be sufficiently similar such that a configuration derived for one pair, can be expected to be similarly effective for the remaining pairs.

Data characterizing the active alignment is recorded (1020). For example, the final spatial arrangement of the lens stack array relative to the sensor, which (if any) cameras were deactivated, and the results of any through focus sweeps may be recorded. The overall performance of the actively aligned lens stack array and sensor may also be recorded, and may serve as a performance benchmark. The recording may be conducting in any suitable fashion. For example, the machine conducting the active alignment can record the data. Alternatively, any other such machine capable of recording the characterization data can do so.

Based on this recorded data, configuration parameters are computed (1030) for the passive alignment of the remaining lens stack arrays and sensors. In many embodiments, the passive alignment configuration parameters are computed so as to replicate the final configuration of the actively aligned representative lens stack array and sensor. The configuration parameters may include parameters relating to the spatial arrangement of the lens stack array relative to the sensor and may also include parameters related to the deactivation of cameras.

In a number of embodiments, the performance of the actively aligned camera is assessed in view of the through focus sweeps, which contain information regarding the best case performance of the cameras. This comparison may inform the extent of the impact that any adhesive curing processes used to affix the spatial relationship of lens stack arrays and sensors may have on the array camera's final imaging abilities. Accordingly, passive alignment configuration parameters may be developed to mitigate any anticipated adverse consequences of such adhesive procedures for affixing the final spatial relationship. For example, the configuration parameters may be developed so as to call for spacers of a greater or lesser thickness, based upon the impact of the adhesive curing process.

In various embodiments, the computation of the configuration parameters comprises using an optics measuring tool (such as a measuring tool manufactured by TriOptics Optical Test Instrument) to measure the (average) back focal length, or any other parameters, of the various lens stacks in the to-be actively aligned lens stack array before it is aligned to the sensor, and relate these measurements to the spatial arrangement of the actively aligned lens stack array and sensor. In several embodiments, the measurements are performed during and/or after alignment. Then, with these relationship known, the optics measuring tool may be used to measure the back focal lengths, or any other measurable parameters, in the remaining lens stack arrays; other measurement devices may be applied to determine any mechanical variations in the packages of the sensor arrays that affect e.g. the focusing quality (cover glass thickness, air gap). A desired spatial arrangement for these remaining lens stack arrays and sensors can be computed using the known relationships, and configuration parameters for them can be computed accordingly. For example, in one instance, the distance between each lens stack and sensor within an actively aligned array camera module is measured and related to the respective lens stack's back focal length. A relationship may then be established between a given lens stack's back focal length and a preferable distances between the lens stack array and a sensor. Then, the back focal lengths of remaining lens stack arrays may be measured, and the lens stack array may be passively aligned in view of the relationship between a back focal length and a preferred distance. These embodiments are advantageous insofar as they do not necessarily rely on the similarity of the lens stack arrays in passively aligning the remaining lens stack arrays and sensors. Instead, any differences in back focal length distributions within the plurality of lens stack arrays are measured, and configuration parameters are developed accordingly to accommodate these differences. Additionally, in numerous embodiments, computing the passive alignment configuration parameters also accounts for through focus curves insofar as the through focus curves may be indicative of the sensitivity of a camera's performance to its spatial relationship. Hence, the through focus curves may be used to determine the tolerances within which the spacers and bond lines used in the passive alignment processes should be implemented. Moreover, in cases where the back focal lengths are measured and accounted for in computing the passive alignment configuration parameters, the data contained in the through focus curves may assist in computing the passive configuration parameters as they characterize sensitivity of the cameras to the spatial relationship of their respective lens stack array relative to their respective focal plane. Thus, the through focus curves may be indicative of the sensitivity of a camera's performance to its spatial relationship. Of course, the data contained in the through focus curves can be used in a variety of ways to facilitate the development of passive alignment configuration parameters in accordance with embodiments of the invention.

The configuration parameters may also specify how to achieve the desired spatial relationship. For example, the following thicknesses within a lens stack/sensor combination may be manipulated to achieve a desired spatial relationship between a lens stack and sensor; the spacer between the lens stack and the cover glass that shields the sensor, the cover glass thickness, the air gap between the cover glass and the sensor, and any spacer beads/adhesive bond lines used in affixing the configuration. The developed configuration parameters can specify the desired respective thicknesses of these parameters to achieve the desired spatial relationship. Note that, in many instances, an actively aligned lens stack array and sensor may use a small spacer to separate the lens stack from the sensor cover glass. However, when passively aligning lens stack, it may be desirable to have a relatively larger spacer separating the lens stack from the cover glass. Accordingly, the configuration parameters may be developed to achieve a desired spatial relationship while operating within the constraint of having the spacer thickness between the lens stack and the cover glass be constrained to within a particular range. Of course, this principal can be applied more generally in that a desired spatial relationship can be attained in any manner, e.g. manipulating any dimensions within a lens stack/sensor combination, in accordance with embodiments of the invention.

The thickness of the elements within the actively aligned lens stack array and sensor may be used in developing these configuration parameters. For example, a cross-section of the actively aligned lens stack array and sensor may be obtained, and the thickness of the relevant components can be measured. Alternatively, in the case where the thickness of the relevant components are all known, except that the adhesive bond line thickness is not known, this thickness may be obtained during the active alignment process by driving the lens stack against the sensor such that it mechanically contacts it, and subsequently repositioning the lens stack in its desired position; the distance between the point where the lens stack is contacting the sensor and its desired position can be approximated as the thickness of the adhesive bond gap. Passively aligned lens stack arrays and sensors may also be cross-sectioned so that the thickness of their elements can be measured. In particular, those passively aligned lens stack arrays and sensors that are exhibiting the best performance traits may be cross-sectioned, so that the thickness of their components may be determined. Accordingly, configuration parameters may be determined in view of these thickness measurements.

With the configuration parameters developed, the remaining lens stack arrays and sensors may be passively aligned (1040) to form array camera modules. This passive alignment process may involve machining spacers and/or employing appropriately sized spacer beads in the adhesive to spatially orient the lens stack arrays and sensors in a desired manner, and may further involve deactivating specified cameras. For example, specific cameras may be deactivated if the final spatial arrangement is such that those cameras deviate in their performance abilities from remaining within the configuration. More generally, any of the above-described principles regarding enhancing the quality of the configuration (e.g. deactivating specific cameras, and augmenting the spatial relationship between the lens stack array and sensor) may be incorporated in passive alignment processes.

Of course, the passively aligned array camera modules may be assessed to determine to what extent their performance abilities are sufficient in view of the imaging abilities of the actively aligned array camera module and/or in view of the through focus curves obtained during the active alignment process. Additionally, as before, the performance of the passively aligned array camera modules may be evaluated in view of the through focus curves, and this comparison may again inform the extent of the impact on the spatial arrangement that the adhesive curing processes may cause. Accordingly, the configuration parameters may be augmented in view of this information.

For example, in many embodiments, the actively and passively aligned array camera modules are assessed relative to the through focus curves, and this assessment is used to augment further alignments. As is evident from the above discussion, the z-positioning of the lens stack array relative to the sensor is a key inquiry in the alignment process, and the through focus curves obtained during the active alignment process can reveal how camera performance varies as a function of relative distance between the lens stack array and the sensor. Hence, the through focus curves obtained during an active alignment can be used to predict the performance of the lens stack array and the sensor as actively aligned. When the representative lens stack array and sensor are actively aligned, the performance of the resulting array camera module can be compared against the predicted performance determined by evaluating the through focus curves, and any discrepancy between the predicted performance and the actual performance of the actively aligned lens stack array and sensor can be attributed to the impact that curing/adhesive processing (and/or any other finishing processing) had on the actively aligned lens stack array and sensor. Thus, for instance, MTF scores for the actively aligned camera may be obtained, and compared against the through focus curve, to infer the actual final z-positioning of the lens stack array to sensor. It can then reasonably be assumed that to the extent that the actual final z-positioning of the lens stack array relative to the sensor deviated from the targeted z-positioning, this deviation may be a function of the curing/adhesive processing, and/or any other finishing processing. Hence, the impact of these finishing processes becomes can be inferred, and further alignment processes can be augmented (e.g. adjusting spacer bead size) to compensate for this determined impact.

Similarly, passively aligned lens stack arrays and sensors may also be evaluated against the through focus curves obtained during the active alignment of the representative lens stack array and sensor to again gauge what the impact any finishing processes may have on the desired z-distance between the lens stack array and the sensor. Thereafter, further alignment processes can be also augmented in view of this determined impact. Of course, any measurement information obtained from optics measuring tools may also be used in augmenting the alignment procedures. Additionally, as mentioned before, the performance of passively aligned lens stack arrays may be assessed against through focus curves obtained from active alignment; in this way, the efficacy of the passive alignment processes can be gauged.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method of aligning a plurality of lens stack arrays with a corresponding plurality of sensors, wherein each of the plurality of sensors includes a plurality of focal planes, where each of the plurality of focal planes comprises a plurality of rows of pixels that also form a plurality of columns of pixels and is contained within a region of the imager array that does not contain pixels from another focal plane, and wherein each particular one of the plurality of lens stack arrays comprises a plurality of lens stacks and each of plurality of lens stacks forms a separate optical channel for each focal plane in the one of the plurality of corresponding sensors that corresponds to the particular one of the plurality of lens stack arrays, the method comprising:

aligning a first one of the plurality of lens stack arrays relative to a first one of the corresponding plurality of sensors that corresponds to the first one of the plurality of lens stack arrays in an initial position;

varying the spatial relationship between the first lens stack array and the first sensor;

capturing a plurality of images of a known target using a set of one or more active focal planes in the plurality of focal planes within the first one of the corresponding plurality of sensors wherein each of the plurality of images is captured having a different spatial relationship between the first one of the plurality of lens stack arrays and the first one of the corresponding plurality of sensors, and wherein the known target including at least one region of interest;

scoring the plurality of images captured by the plurality of active focal planes, where the resulting scores provide a direct comparison of the extent to which at least one region of interest is focused in the plurality of images; and aligning at least a second one of the plurality of lens stack arrays relative to at least a second one of the plurality of corresponding sensors that corresponds to the second one of the plurality of lens stack arrays, based on the scores of the plurality of images captured by the set of active focal planes of the first one of the plurality of corresponding images and the corresponding spatial relationships by which the respective scored plurality of images were obtained.

2. The method of claim 1 wherein each set of a sensor and a lens stack array from the plurality of lens stack arrays and the plurality of corresponding sensors are sufficiently similar to one another.

3. The method of claim 2 wherein the first one of the plurality of lens stack arrays and the first one of the plurality of corresponding sensors are representative of all sets of a sensor and a lens stack array from the plurality of lens stack arrays and the plurality of corresponding sensors.

* * * * *